United States Patent
Yun et al.

(10) Patent No.: US 8,860,374 B2
(45) Date of Patent: Oct. 14, 2014

(54) CONTROL CIRCUIT OF SECONDARY BATTERY

(75) Inventors: Hanseok Yun, Gyeonggi-do (KR); Susumu Segawa, Gyeonggi-do (KR); Testuya Okada, Gyeonggi-do (KR); Euijeong Hwang, Gyeonnggi-do (KR); Sesub Sim, Gyeonggi-do (KR); Jongwoon Yang, Gyenoggi-do (KR); Beomgyu Kim, Gyeonggi-do (KR); Jinwan Kim, Gyeonggi-do (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 449 days.

(21) Appl. No.: 12/917,313

(22) Filed: Nov. 1, 2010

(65) Prior Publication Data

US 2011/0101922 A1    May 5, 2011

(30) Foreign Application Priority Data

Oct. 30, 2009    (KR) .................. 10-2009-0104494

(51) Int. Cl.
*H02J 7/00* (2006.01)
*H01M 10/44* (2006.01)

(52) U.S. Cl.
CPC ........... *H02J 7/0078* (2013.01); *H01M 10/441* (2013.01); *Y02E 60/12* (2013.01)
USPC ........................................................ 320/134

(58) Field of Classification Search
USPC ................. 320/128, 132, 134, 152, 157–159, 320/162–165
See application file for complete search history.

(56) References Cited

U.S. PATENT DOCUMENTS

| 5,254,951 | A | * | 10/1993 | Goto et al. .................... 324/426 |
| 5,722,378 | A | | 3/1998 | Sawazaki et al. |
| 6,140,928 | A | * | 10/2000 | Shibuya et al. .......... 340/636.13 |
| 6,335,611 | B1 | * | 1/2002 | Sasaki ........................... 320/134 |
| 2003/0169078 | A1 | | 9/2003 | Onishi |
| 2006/0077603 | A1 | | 4/2006 | Kim |
| 2007/0013344 | A1 | * | 1/2007 | Aradachi et al. ............. 320/132 |
| 2008/0224665 | A1 | | 9/2008 | Matsumoto et al. |

FOREIGN PATENT DOCUMENTS

| JP | 07-259712 A | 10/1995 |
| JP | 9-182300 A | 7/1997 |
| JP | 2002-184470 A | 6/2002 |
| JP | 2003-215172 A | 7/2003 |
| JP | 2008-232645 A | 10/2008 |
| KR | 10-2006-0022555 A | 3/2006 |

OTHER PUBLICATIONS

Korean Notice of Allowance dated Aug. 11, 2011 for Korean Patent Application No. KR 10-2009-0104494 which corresponds to captioned U.S. Appl. No. 12/917,313.

* cited by examiner

*Primary Examiner* — Richard V Muralidar
(74) *Attorney, Agent, or Firm* — Knobbe, Martens, Olson & Bear, LLP

(57) ABSTRACT

A control circuit for a secondary battery is disclosed. The control circuit comprising a measuring unit electrically connected with a single connection to a current carrying line for charging and discharging the battery, wherein the measuring unit is configured to generate a voltage value corresponding to current in the current carrying line.

15 Claims, 2 Drawing Sheets

CONTROL CIRCUIT OF SECONDARY BATTERY

CROSS-REFERENCE TO RELATED APPLICATIONS

This application claims priority to and the benefit of Korean Patent Application No. 10-2009-0104494, filed on Oct. 30, 2009, in the Korean Intellectual Property Office, the disclosure of which is incorporated herein, by reference.

BACKGROUND

1. Field

The disclosed technology relates to a control circuit of a secondary battery, which can control charging and discharging of the secondary battery by measuring both a charge current and a discharge current flowing in a large current line of the secondary battery.

2. Description of the Related Technology

In general, with the development of light portable wireless electronic devices with complex functionality such as video cameras, cellular phones, portable computers, and other devices, secondary batteries used as the main power supply of these portable electronic devices have been actively developed and produced. For example, a secondary battery may be a nickel-cadmium battery, a nickel-hydrogen battery, a nickel-zinc battery and a lithium secondary battery, and other batteries. Among them, the lithium secondary battery has been widely used for up-to-date electronic devices because the lithium secondary battery may be recharged and the size of the battery may be small yet have large capacity, a high operating voltage and high energy density per unit weight.

The secondary battery can be configured to have a battery pack, where the battery pack includes a battery cell with an electrode assembly, a can accommodating the electrode assembly, and a cap assembly hermetically sealing the can. The battery pack can also include a circuit module with a protective circuit element and the battery cell. The battery pack can also include a cover covering the circuit module. In order to ensure operational safety of a secondary battery, it is particularly beneficial to control charge and discharge of the circuit module to avoid overcharging and overdischarging.

SUMMARY OF CERTAIN INVENTIVE ASPECTS

One inventive aspect is a control circuit for a battery. The control circuit includes a measuring unit electrically connected to a current carrying line for charging and discharging the battery, where the measuring unit is configured to generate an voltage value corresponding to current in the current carrying line. The control circuit also includes a level shift unit connected to the measuring unit and configured to generate an output voltage which is an amplified and level-shifted version of one of the generated voltage values.

Another inventive aspect is a control circuit for a battery. The control circuit includes an amplification unit with a first amplifier, where the amplification unit is configured to receive a voltage corresponding to a charging current or a discharging current of the battery and to generate an output voltage, where the output voltage of the amplification unit is an amplified version of the received voltage. The control circuit also includes a level shift unit including a reference voltage terminal configured to receive a reference voltage, where the level shift unit is configured to receive the output voltage of the amplification unit and to generate an output voltage, where the output voltage of the level shift unit is a level-shifted version of the output voltage of the amplification unit and the output voltage of the amplification unit is level shifted by an amount based on the reference voltage.

BRIEF DESCRIPTION OF THE DRAWINGS

Various aspects, features and advantages of inventive concepts will be more apparent from the following detailed description in conjunction with the accompanying drawings, in which.

DETAILED DESCRIPTION OF CERTAIN INVENTIVE EMBODIMENTS

Certain inventive embodiments are described in detail so that those skilled in the art may learn various aspects with reference to the accompanying drawings.

Figure 1:
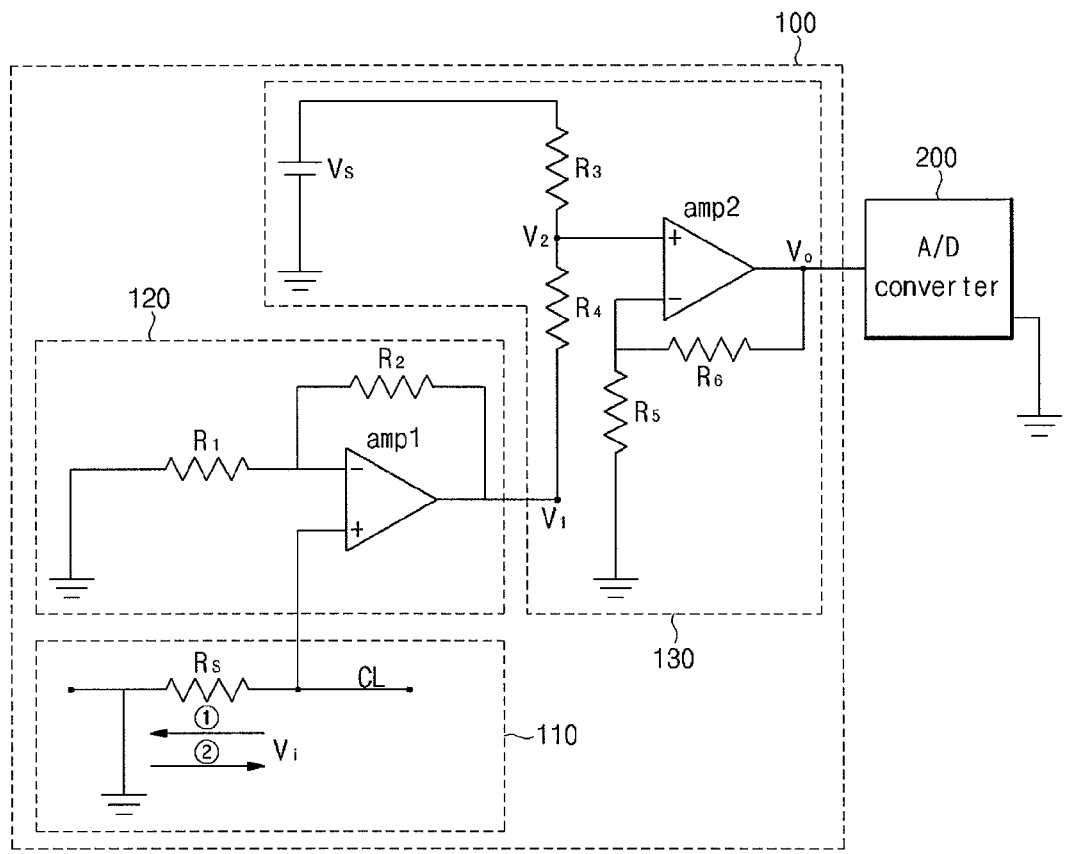
FIG. 1 is a schematic diagram of a control circuit of a secondary battery according to an embodiment.

FIG. 1 is a schematic diagram of a control circuit of a secondary battery according to an embodiment.

Referring to FIG. 1, the control circuit includes a charge/discharge current measuring circuit 100. The charge/discharge current measuring circuit 100 may be electrically connected to an A/D converter 200.

The charge/discharge current measuring circuit 100 includes a measuring unit 110 connected to a large current line CL, an amplification unit 120 connected to the measuring unit 110, and a level shifting unit 130 connected to the amplification unit 120.

The measuring unit 110 may be connected to the large current line CL in series. The measuring unit 110 measures currents of the large current line CL. The measuring unit 110 may be a shunt resistor Rs. Since the voltage across the shunt resistor Rs is proportional to the current flowing in the large current line CL and the resistance of the shunt resistor Rs is a known value, the current values of the large current line CL can be obtained from the voltage across the shunt resistor Rs.

One end of the shunt resistor Rs is connected to a ground voltage, and the other end is connected to the amplification unit 120. Accordingly, the voltage of the other end of the shunt resistor Rs is input to the amplification unit 120 as an input voltage Vi.

The polarity of the input voltage Vi varies according to the direction of current flowing in the large current line CL. Specifically, when a discharge current flows in the large current line CL in the direction indicated by ①, the input voltage Vi will have a positive (+) polarity with respect to the ground voltage. On the other hand, when a charge current flows in the large current line CL in the direction indicated by ②, the input voltage Vi will have a negative (−) polarity with respect to the ground voltage.

The amplification unit 120 is electrically connected to the measuring unit 110. The amplification unit 120 receives and amplifies the input voltage Vi of the measuring unit 110 and outputs a first voltage value V1.

The amplification unit 120 includes a first amplifier amp1 connected to the shunt resistor Rs and receiving the first input voltage Vi, and a first resistor R1 and a second resistor R2 forming a feedback path around the first amplifier amp1.

Here, the first amplifier amp 1 may be an operational amplifier in which the input voltage Vi of the shunt resistor Rs is connected to the positive (+) terminal. For the sake of computational convenience, it is assumed that the operational amplifier is an ideal amplifier. In some embodiments, the feedback formed by the first resistor R1 and the second resistor R2 may be a positive feedback connected to a negative (−) terminal of the amp1.

In the embodiment of FIG. 1, the relationship between the input voltage Vi and the first voltage V1 flowing through and output from the amplification unit 120 is given by:

$$V_1 = \left(1 + \frac{R_2}{R_1}\right) \cdot V_i \quad (1)$$

As given in the equation (1), the amplification unit 120 amplifies the input voltage $V_i$ by $(1+(R_2/R_1))$ times and outputs the first voltage $V_1$.

The level shifting unit 130 receives values of the first voltage $V_1$ and level-shifts the values of the first voltage $V_1$. In this embodiment, the level shifting unit 130 level-shifts all of the values of the first voltage $V_1$ to positive (+) polarity values with respect to the ground voltage. Since the first voltage $V_1$ is an amplified input voltage $V_i$, the polarity of the first voltage $V_1$ is the same as that of the input voltage $V_i$, that is, either a positive (+) or a negative (−) polarity. However, the A/D converter 200 connected to the output end of the level shifting unit 130 receives only a positive (+) value. Accordingly, the level shifting unit 130 level-shifts all of values of the first voltage $V_1$ to positive (+) polarity values so that they may be applied to the A/D converter 200.

The level shifting unit 130 includes a reference voltage source $V_s$, and a third resistor $R_3$ and a fourth resistor $R_4$ connected in series between the reference voltage source $V_s$ and output node of the amplification unit 120. The level shifting unit 130 also includes a second amplifier amp2 having a positive (+) input terminal connected to the node between the third and fourth resistors $R_3$ and $R_4$, a fifth resistor $R_5$ and a sixth resistor $R_6$ forming a feedback path for the second amplifier amp2.

The reference voltage source $V_s$ is supplied from a separate power source. The reference voltage source $V_s$ supplies a direct-current (DC) value as the reference voltage source $V_s$.

The third resistor $R_3$ and the fourth resistor $R_4$ are connected in series between the reference voltage source $V_s$ and the output node of the amplification unit 120, which outputs the first voltage $V_1$. Here, assuming that a voltage of the node between the third resistor $R_3$ and the fourth resistor $R_4$ is a second voltage $V_2$, the relationship between the first voltage $V_1$ and the second voltage $V_2$ is given by:

$$V_2 = (V_s - V_1) \cdot \left(\frac{R_4}{R_3 + R_4}\right) + V_1 \quad (2)$$
$$= \left(\frac{R_3}{R_3 + R_4}\right) \cdot V_1 + \left(\frac{R_4}{R_3 + R_4}\right) \cdot V_s$$

As confirmed in the equation (2), the second voltage $V_2$ is a linearly changed and shifted version of the first voltage $V_1$. Substituting for $V_1$ from equation (1), the equation (2) can be rewritten to show the relationship between the input voltage $V_i$ and the second voltage $V_2$ as:

$$V_2 = \left(\frac{R_3}{R_3 + R_4}\right) \cdot \left(1 + \frac{R_2}{R_1}\right) \cdot V_i + \left(\frac{R_4}{R_3 + R_4}\right) \cdot V_s \quad (3)$$

As shown in equation (3), the second voltage $V_2$ is a linearly changed and shifted value of the input voltage $V_i$. As shown, $V_i$ is scaled by $(R_3/(R_3+R_4))(1+(R_2/R_1))$ times and the scaled $V_i$ is orthogonally shifted by a value of $(R_4/(R_3+R_4))$ $V_s$.

The second amplifier amp2 receives the second voltage $V_2$ at its positive (+) terminal. The second amplifier amp2 may also be an operational amplifier, and for the sake of computational convenience, it is assumed that the second amplifier amp2 is an ideal operational amplifier. In some embodiments, the fifth resistor $R_5$ and the sixth resistor $R_6$ may form a positive feedback path connected to the negative (−) terminal of the second amplifier amp2.

The second amplifier amp2 amplifies the second voltage source $V_2$ and outputs an output voltage $V_o$. The relationship between the second voltage $V_2$ and the output voltage $V_o$ can be represented by the equation (4):

$$V_o = \left(1 + \frac{R_6}{R_5}\right) \cdot V_2 \quad (4)$$

Substituting for $V_2$ from equation (3), the relationship between the output voltage $V_o$ and the input voltage $V_i$ can be rewritten as:

$$V_o = \left(1 + \frac{R_6}{R_5}\right) \cdot \left(\left(\frac{R_3}{R_3 + R_4}\right) \cdot \left(1 + \frac{R_2}{R_1}\right) \cdot V_i + \left(\frac{R_4}{R_3 + R_4}\right) \cdot V_s\right) \quad (5)$$
$$= \frac{R_3 \cdot (R_1 + R_2) \cdot (R_5 + R_6)}{R_1 \cdot R_5 \cdot (R_3 + R_4)} \cdot V_i + \frac{R_4 \cdot (R_5 + R_6)}{R_5 \cdot (R_3 + R_4)} \cdot V_s$$

As shown in the equation (5), the output voltage $V_o$ is obtained by scaling the input voltage $V_i$ by $(R_3*(R_1+R_2)*(R_5+R_6))/(R_1*R_5*(R_3+R_4))$ times and orthogonally shifting the scaled voltage by $(R_4*(R_5+R_6))/(R_5*(R_3+R_4))*V_s$. Accordingly, the output voltage $V_o$ is obtained by linearly varying and shifting the input voltage $V_i$. Accordingly, the level shifter 130 can level-shift the input voltage $V_i$ according to the resistance values of the first to sixth resistors $R_1$-$R_6$ and a preset value of the reference voltage source $V_s$. As described above, even if the input voltage $V_i$ has a negative (−) polarity, the level shifter 130 shifts the level of the input voltage $V_i$ to a positive (+) voltage level so as to be appropriate for the A/D converter 200.

The A/D converter 200 is connected to the level shifter 130. The A/D converter 200 receives the output voltage $V_o$ of the level shifter 130 and converts the output voltage $V_o$ into a digital signal. In addition, the A/D converter 200 applies the digital signal into a microcomputer (not shown) to allow charge/discharge currents flowing in the large current line to be sensed and controlled by the microcomputer.

Hereinafter, a level shifting operation performed by the control circuit of the secondary battery according to an embodiment is described in detail.

Figure 2:
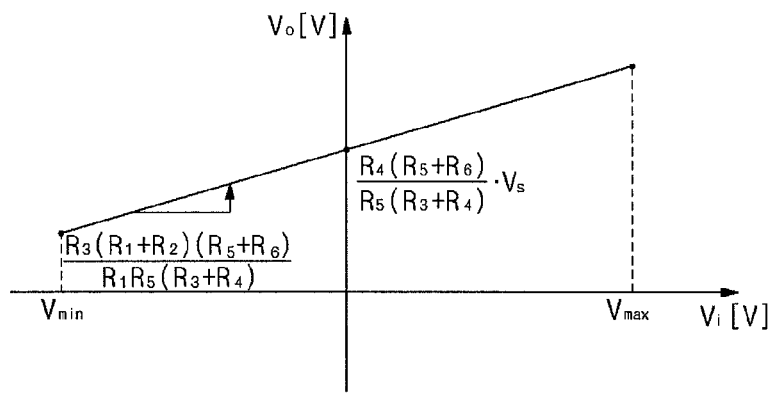
FIG. 2 is a graph illustrating a level shifting operation performed by the control circuit shown in FIG. 1.

FIG. 2 is a graph illustrating a level shifting operation performed by the control circuit shown in FIG. 1.

Referring to FIG. 2, the relationship between the input voltage $V_i$ and the output voltage $V_o$ is graphically illustrated. The graph illustrated in FIG. 2 is based on the relationship given by the equation (5). As described above, when a current flowing in the large current line CL is a discharge current, as indicated by ①, the input voltage $V_i$ measured at the shunt resistor $R_s$ has a positive (+) polarity and lies in the first and fourth quadrants of the graph illustrated in FIG. 2. On the other hand, when a current flowing in the large current line CL is a charge current, as indicated by ②, the input voltage $V_i$ measured at the shunt resistor $R_s$ has a negative (−) polarity and lies in the second and third quadrants of the graph illustrated in FIG. 2.

The output voltage $V_o$ at the output of the charge/discharge current measuring circuit 100 is a linearly changed and shifted version of the input voltage $V_i$. In this case, the slope is $R_3*(R_1+R_2)*(R_5+R_6))/(R_1*R_5(R_3+R_4)$, and the y-intercept is $R_4*(R_5+R_6))/(R_5*(R_3+R_4))*V_s$. Accordingly, the output voltage $V_o$ is level-shifted to be located on the first and second quadrants within a measuring range of the input voltage $V_i$, that is, ranging from Vmin to Vmax.

The output voltage $V_o$ is level-shifted to have a positive (+) voltage within the measuring range of the input voltage $V_i$ from Vmin to Vmax, irrespective of the voltage of the input voltage $V_i$. Therefore, the output voltage $V_o$ can be applied to the A/D converter 200 as an input.

Next, another specific exemplary level shifting operation of the control circuit of the secondary battery according to an embodiment is described.

Figure 3:
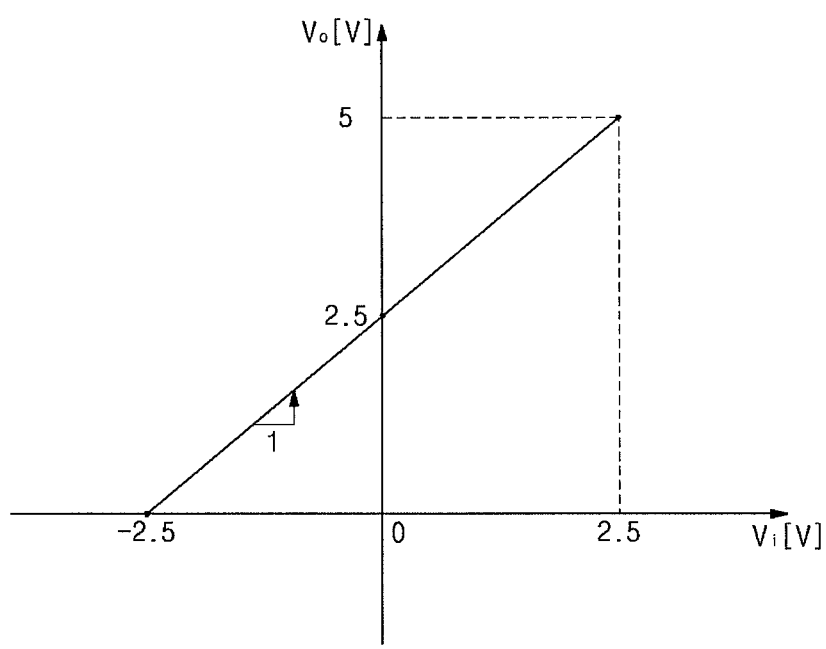
FIG. 3 is a graph illustrating an example of the level shifting operation shown in FIG. 2.

FIG. 3 is a graph illustrating an example of the level shifting operation shown in FIG. 2, where the range of the input voltage $V_i$ is from the minimum value Vmin, −2.5[V] to the maximum value Vmax, 2.5[V]. In this embodiment, in the control circuit of the secondary battery, the first resistor $R_1$, the second resistor $R_2$, the third resistor $R_3$, and the fourth resistor $R_4$ have the same resistance values, the second amplifier amp2 is a voltage follower by short circuiting the sixth resistor $R_6$, and the value of the reference voltage source $V_s$ is preset to 5[V].

Under these conditions, the equation (5) can be written as:

$$V_o = V_i + \frac{1}{2} \cdot V_s \quad (6)$$
$$= V_i + 2.5$$

Therefore, the output voltage $V_o$ can be level-shifted as a linear function in which the slope with respect to the input voltage $V_i$ is 1 and the y-intercept is 2.5. In other words, in the control circuit of the secondary battery, the charge/discharge current measuring circuit 100 level-shifts the input voltage $V_i$ ranging from −2.5[V] to 2.5[V] to the output voltage $V_o$ ranging from 0[V] to 5[V].

As described above, in the control circuit of the secondary battery, the discharge/charge current flowing in the large current line CL, as measured by the charge/discharge current measuring circuit 100, are linearly level-shifted by the level shifting unit 130 to be changed to positive (+) voltages and then applied to the A/D converter 200, thereby enabling the microcomputer to easily control both the discharge current and the charge current.

Although various aspects have been described with reference to certain exemplary embodiments, it will be understood by those skilled in the art that a variety of modifications and variations may be made.

What is claimed is:

1. A control circuit for a battery, the control circuit comprising:
    a measuring unit electrically connected with only a single connection to a current carrying line for charging and discharging the battery, wherein the measuring unit is configured to generate a voltage value corresponding to current in the current carrying line;
    an amplification unit connected to the measuring unit and configured to amplify the generated voltage value received from the measuring unit and output the amplified voltage value, wherein the amplification unit comprises an operational amplifier, and wherein the amplification unit is configured to have a negative feedback; and
    a level shift unit connected to the amplification unit and configured to generate an output voltage which is a level-shifted version of the amplified voltage value for any generated voltage value, wherein the level shifting unit level-shifts all of the amplified voltage values to positive polarity values with respect to a ground voltage, wherein the level shifting unit comprises an operational amplifier, and wherein the level shifting unit is configured to have a negative feedback.

2. The control circuit of claim 1, wherein the generated voltage values have opposite polarities during charging and discharging.

3. The control circuit of claim 1, wherein the measuring unit comprises a resistor connected to the current carrying line.

4. The control circuit of claim 1, wherein the level shifting unit linearly level-shifts the amplified voltage values.

5. The control circuit of claim 1, wherein the amplification unit compares the measured voltage values with a reference voltage value and amplifies the same.

6. A control circuit for a battery, the control circuit comprising:
    an amplification unit comprising a first amplifier, wherein the amplification unit is configured to receive a voltage from only a single measuring point corresponding to a charging current or a discharging current of the battery and to generate an output voltage, wherein the output voltage of the amplification unit is an amplified version of the received voltage, wherein the amplification unit comprises an operational amplifier, and wherein the amplification unit is configured to have a negative feedback; and
    a level shift unit comprising a reference voltage terminal configured to receive a reference voltage, wherein the level shift unit is configured to receive the output voltage of the amplification unit and to generate an output voltage, wherein the output voltage of the level shift unit is a level-shifted version of the output voltage of the amplification unit for any generated voltage value and the output voltage of the amplification unit is level shifted by an amount based on the reference voltage, wherein the level shifting unit level-shifts all of the amplified voltage values to positive polarity values with respect to a ground voltage, wherein the level shifting unit comprises an operational amplifier, and wherein the level shifting unit is configured to have a negative feedback.

7. The control circuit of claim 6, wherein the amplification unit further comprises first and second resistors, and wherein the amplification unit is configured to amplify the received voltage by a factor determined by the first and second resistors.

8. The control circuit of claim 7, wherein the first and second resistors have the same value of resistance.

9. The control circuit of claim 6, wherein the level shift unit further comprises third and fourth resistors, and wherein the level shift unit is configured to level shift the output of the amplification unit by an amount based on the third and fourth resistors.

10. The control circuit of claim 9, wherein the third and fourth resistors have the same value of resistance.

11. The control circuit of claim 9, wherein the level shift unit further comprises a second amplifier, and the amplifier is configured to generate the output voltage of the level shift unit based on the level shifted output of the amplification unit.

12. The control circuit of claim 11, wherein the level shift unit further comprises fifth and sixth resistors, and wherein the level shift unit is configured to level shift the output of the amplification unit by an amount based on the fifth and sixth resistors.

13. The control circuit of claim 11, wherein the level shift unit further comprises fifth and sixth resistors, and wherein the level shift unit is configured to amplify the output of the amplification unit by an amount based on the fifth and sixth resistors.

14. The control circuit of claim 11, wherein the second amplifier is configured as a voltage follower.

15. The control circuit of claim 6, wherein the output voltage of the level shift unit is a level-shifted version of the output voltage of the amplification unit for any value of the voltage received by the amplification unit.

* * * * *

UNITED STATES PATENT AND TRADEMARK OFFICE
CERTIFICATE OF CORRECTION

PATENT NO.        : 8,860,374 B2
APPLICATION NO.   : 12/917313
DATED             : October 14, 2014
INVENTOR(S)       : Yun et al.

It is certified that error appears in the above-identified patent and that said Letters Patent is hereby corrected as shown below:

On the title page item [75],

Line 4, Change "Gyeonnggi-do" for Euijeong Hwang to --Gyeonggi-do--.

Line 6, Change "Gyenoggi-do" for Jongwoon Yang to --Gyeonggi-do--.

In the drawings

Drawing Sheet 2 of 2 (FIG. 3), Below "0" delete " 070210 ".

9293885

Signed and Sealed this
Twenty-sixth Day of January, 2016

Michelle K. Lee
*Director of the United States Patent and Trademark Office*